US009825308B1

(12) United States Patent
Liu et al.

(10) Patent No.: US 9,825,308 B1
(45) Date of Patent: Nov. 21, 2017

(54) LOW PLATINUM CATALYST AND METHOD OF PREPARATION

(71) Applicant: UChicago Argonne, LLC, Chicago, IL (US)

(72) Inventors: Di-Jia Liu, Elmhurst, IL (US); Lina Chong, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/203,083

(22) Filed: Jul. 6, 2016

(51) Int. Cl.
*B01J 23/42* (2006.01)
*B01J 23/56* (2006.01)
*H01M 4/92* (2006.01)

(52) U.S. Cl.
CPC ........ *H01M 4/921* (2013.01); *H01M 4/926* (2013.01)

(58) Field of Classification Search
CPC ........ B01J 23/42; B01J 23/56; B01J 37/0018; B01J 20/3057; H01M 4/921; H01M 4/926
USPC ................................. 502/182, 185; 420/466
See application file for complete search history.

(56) References Cited

U.S. PATENT DOCUMENTS

| 8,835,343 | B2 | 9/2014 | Liu et al. | |
|---|---|---|---|---|
| 9,012,344 | B2 | 4/2015 | Liu et al. | |
| 9,180,443 | B1 * | 11/2015 | Serov | B01J 37/0018 |
| 2009/0183996 | A1 * | 7/2009 | Richter | B01J 20/226 |
| | | | | 205/424 |
| 2011/0143913 | A1 * | 6/2011 | Yang | H01M 4/90 |
| | | | | 502/1 |
| 2012/0077667 | A1 * | 3/2012 | Liu | H01M 4/8605 |
| | | | | 502/101 |
| 2014/0099571 | A1 * | 4/2014 | Proietti | H01M 4/8828 |
| | | | | 429/527 |
| 2015/0180045 | A1 * | 6/2015 | Liu | H01M 4/9008 |
| | | | | 429/527 |
| 2015/0295248 | A1 * | 10/2015 | Serov | H01M 4/90 |
| | | | | 502/159 |
| 2015/0340705 | A1 * | 11/2015 | Tylus | H01M 4/88 |
| | | | | 429/531 |
| 2015/0380741 | A1 * | 12/2015 | Serov | H01M 4/925 |
| | | | | 429/524 |
| 2016/0211529 | A1 * | 7/2016 | Kurungot | H01M 4/86 |

FOREIGN PATENT DOCUMENTS

WO     2007/007113     *  1/2007

OTHER PUBLICATIONS

"Enhanced performance of non-PGM catalysts in air operated PEM-fuel cells," Heather M. Barkholtz et al. International Journal of Hydrogen Energy 41 (2016), pp. 22598-22604.*

"Templated bi-metallic non-PGM catalysts for oxygen reduction," Alexey Serov et al. Electrochimica Acta 80 (2012), pp. 213-218.*

(Continued)

*Primary Examiner* — Patricia L Hailey
(74) *Attorney, Agent, or Firm* — Foley & Lardner LLP

(57) ABSTRACT

A low platinum catalyst and method for making same. The catalyst comprises platinum-transition metal bimetallic alloy microcrystallites over a transition metal-nitrogen-carbon composite. A method of making a catalyst comprises preparation of transition metal organic frameworks, infusion of platinum, thermal treatment, and reduction to form the microcrystallites and composite.

20 Claims, 13 Drawing Sheets

(56) References Cited

OTHER PUBLICATIONS

"Catalytic Hydrolysis of Ammonia Borane via Cobalt Palladium Nanoparticles," Daohua Sun et al. ACS Nano 2011, pp. 6458-6464.*
"Hollow Metallic Microspheres: Fabrication and Characterization," Ran Yi et al. J. Phys. Chem. C 2009, 113, pp. 1222-1226.*
"Honeycomb-like mesoporous nitrogen-doped carbon supported Pt catalyst for methanol electrooxidation," Li-Mei Zhang et al. Carbon 93 (2015), pp. 1050-1058.*
"Tri-metallic transition metal-nitrogen-carbon catalysts derived by sacrificial support method synthesis," Alexey Serov et al. Electrochimica Acta 109 (2013), pp. 433-439.*
Faubert et al., Activation and Characterization of Fe-Based Catalysts for the Reduction of Oxygen in Polymer Electrolyte Fuel Cells, Aug. 29, 1997, 16 pages.
Jasinski, Nature, Mar. 21, 1964, 2 pages.
LeFevre et al., Fe-Based Catalysts for the Reduction of Oxygen in Polymer Electrolyte Membrane Fuel Cell Conditions: Determination of the Amount of Peroxide Released During Electroreduction and Its Influence on the Stability of the Catalysts, 2003, 12 pages.
LeFevre et al., Iron-Based Catalysts with Improved Reduction Activity in Polymer Electrolyte Fuel Cells, 2009, 5 pages.
Lux et al., Heat-Treatment of Metal-Organic Frameworks for Green Energy Applications, 2014, 13 pages.
Ma et al., Framework-Catenation Isomerism in Metal-Organic Frameworks and Its Impact on Hydrogen Uptake, 2006, 2 pages.
van Veen et al., Oxygen Reduction on Monomeric Transition Metal Phthalocyanines in Acid Electrolyte, 1979, 8 pages.
Zhao et al., Highly Efficient Non-Precious Metal Electrocatalysts Prepared from One-Pot Synthesized Zeolitic Imidazolate Frameworks, 2014, 5 pages.

* cited by examiner

LOW PLATINUM CATALYST AND METHOD OF PREPARATION

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to low platinum catalysis and methods of preparation for same.

BACKGROUND

Fuel cell is an effective device that can convert the chemical energy to the electric energy through the electrocatalytic reactions. The proton exchange membrane fuel cell (PEMFC) operates at a relatively low temperature with the gas phase hydrogen as fuel and oxygen (air) as oxidant. Due to its high conversion efficiency, low noise and low emissions, PEMFC is deemed with high potential in automobile and distributed power generation.

At the core of a PEMFC is the membrane electrode assembly (MEA) which consists of an anode, a cathode and a polymer electrolyte layer in between. At the surface of the anode, hydrogen is oxidized to proton through the electrocatalytic process

$$H_2 \rightarrow 2H^+ + 2e^- \quad (1)$$

The protons thus produced are transported to the cathode side through the proton conductive membrane. At the surface of the cathode, oxygen is electro-catalytically reduced and subsequently reacts with protons from the equation (1) to form water

$$O_2 + 4e^- + 4H^+ \rightarrow 2H_2O \quad (2)$$

The reaction (2) is also known as the oxygen reduction reaction (ORR). The reactions (1) and (2) occur on the surface of the electrode catalysts. At present, the most effective catalyst for these reactions are made of platinum supported on the amorphous carbon. A typical Pt loading on the MEA surface ranges from 0.2 mg/cm$^2$ to 0.4 mg/cm$^2$. Since platinum is a precious metal with limited supply, its usage adds a significant cost to a PEMFC system. Other platinum group metals (PGMs), such as Pd, Rh, Ru, etc., are also being evaluated as the replacement for Pt. They too, suffer the issues on the high cost and limited reserves.

Cathodic oxygen reduction reaction, such as that described by the Equation 2, typically occurs at the surface of platinum in the electro-catalyst. Molecular oxygen is first adsorbed on the Pt active site and is subsequently converted to the water by capturing four electrons and reacting with four protons. Few catalyst metals were found to have a comparable catalytic efficiency as that of platinum for the ORR. Those found with similar catalytic activity usually belongs to the precious group metals (PGM), such as Pd, Rh, Ir, Ru, etc., in addition to Pt. The PGMs generally carry high price due to limited reserve worldwide. The use of PGMs in an electrochemical device such as fuel cell will add significant cost to the system therefore creating major barrier for commercialization. For example, a typical polymer electrolyte fuel cell (PEFC) contains 0.2 mgPt/cm$^2$ or higher at the cathode side of the membrane electrode assembly. It is highly desirable to find the method to prepare the electrode catalyst at significantly reduced PGMs usage in fuel cell and similar electrocatalytic application.

SUMMARY

Embodiments described herein relate generally to a method of catalyst preparation: preparing a transition metal based metal organic framework (MOF); thermally treating the transition metal MOF at a temperature of 600° C. to 1050° C. for between 30 minutes and 180 minutes converting the transition metal MOF to a transition metal-nitrogen-carbon composite; removing a portion of the transition metal; adding a platinum precursor to the transition metal-nitrogen-carbon composite after removal of the portion; and forming platinum-transition metal bimetallic alloy microcrystallites over the transition metal-nitrogen-carbon composite.

In some embodiments, a method of catalyst preparation: preparing a transition metal based metal organic framework (MOF); adding a platinum precursor by infiltration to the transition metal MOF; thermally treating the transition metal at a temperature of 600° C. to 800° C. in a reducing environment for 15 minutes to 60 minutes and converting the transition metal MOF to a transition metal-nitrogen-carbon composite, forming platinum-transition metal bimetallic alloy microcrystallites over a transition metal-nitrogen-carbon composite.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
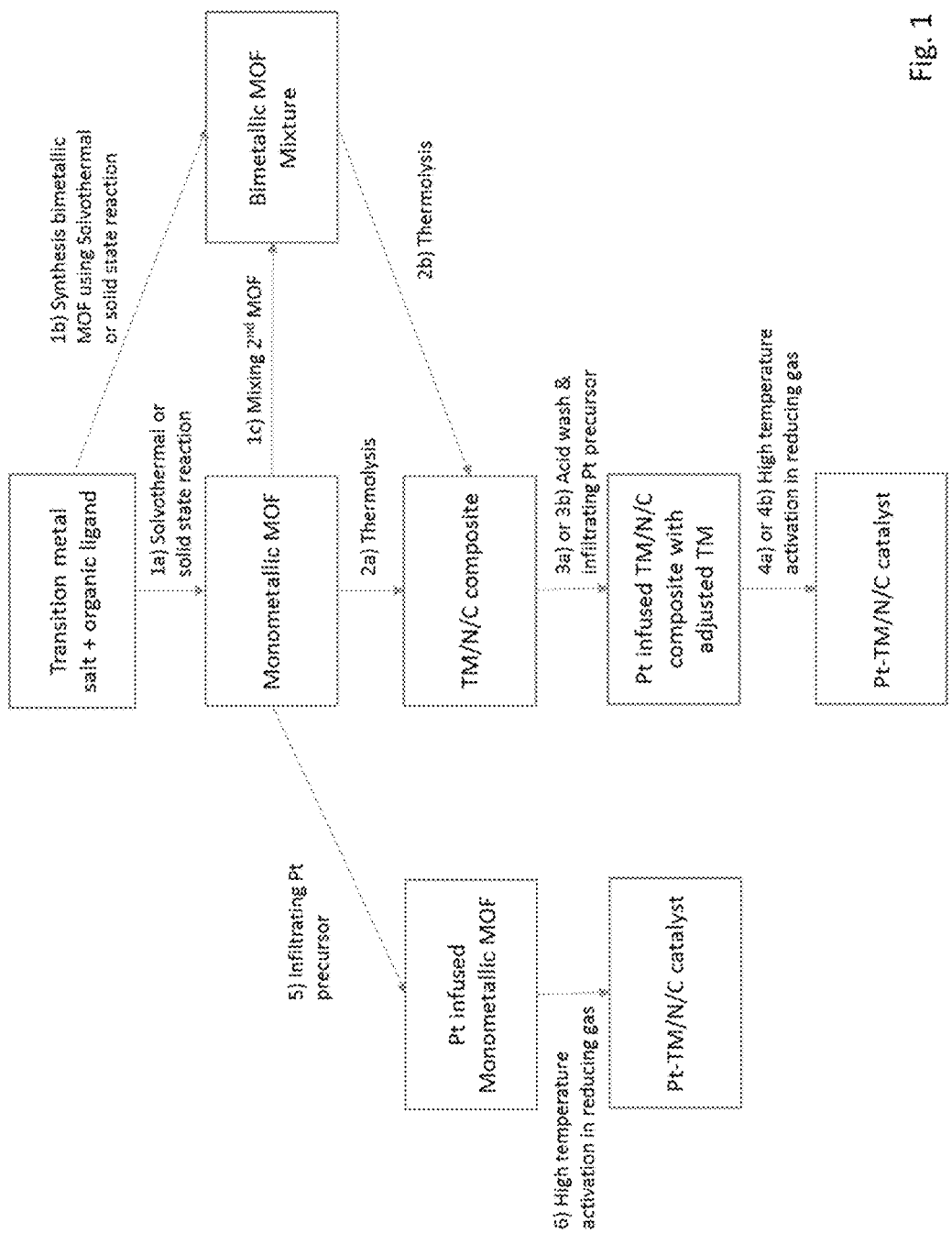
FIG. 1 The process flow chart of preparing low-Pt catalyst using metal organic framework materials as the precursor.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

There have been many activities in searching for the low-cost replacement for PGMs, mainly through the materials involving the transition metal compounds. For example, it has been known that the molecules containing macrocyclic structure with an iron or cobalt ion coordinated by nitrogen from the four surrounding pyrrolic rings have the catalytic activity to capture and to reduce molecular oxygen. It was later demonstrated that ORR catalytic activity can be further improved for such systems containing coordinated $FeN_4$ and $CoN_4$ macrocycles if they have been heat-treated. Examples of macro-molecular system containing $FeN_4$ and $CoN_4$ moieties include corresponding transitional metal phthalocyanine, porphyrin, etc. Other experiments have shown a similar method of making amorphous carbon based catalyst with good ORR activity by mixing macromolecules with $FeN_4$ group and carbonaceous material or synthetic carbon support, followed by high temperature treatment in the gas mixture of ammonia, hydrogen and argon. They found that high temperature of iron salt adsorbed on the carbon in the presence nitrogen precursor can also produce catalyst with very good ORR activity. They attributed the catalytic activity to the active site with a phenanthroline type structure where Fe ion is coordinated to four pyridinic nitrogens. They also found that the catalyst thus produced will decompose in an acidic condition to release iron, thus is unstable for the electro-catalytic reaction such as that inside of a fuel cell cathode.

In addition, prior non-PGM catalysts created through the use of thermolysis of transition metal based metal-organic frameworks (U.S. Pat. No. 9,012,344) and porous organic polymers (U.S. Pat. No. 8,835,343) precursors, both incorporated herein by reference, has been developed but failed to achieve the necessary performance. These non-PGM catalysts, though demonstrated promising initial activities, are usually unstable and loss their activities under repeated voltage polarization conditions such as used in fuel cell operation. It is therefore highly desirable to modify such catalysts with significantly improved activity and durability.

Embodiments described herein relate generally to a method of preparing the catalysts, such as electrodes, for the oxygen reduction reaction that contains mainly transition metals, carbon, nitrogen and platinum. Catalysts made in accordance with embodiments described herein include very low concentration of platinum relative to current commercial catalysts. Typically, the catalysts prepared in accordance with embodiments described herein can achieve similar fuel cell performance with only one tenth to one fifth of platinum content of that used in the commercial catalysts.

One embodiment relates to a method of producing electrocatalysts for ORR containing very low platinum content using MOF as precursors. For example, FIG. 1 illustrates a flow chart illustrating processes for creating a catalyst In a first step, a transition metal based MOF is prepared. Described herein are three parallel approaches. In step 1a, a transition metal based MOF is prepared using known chemical synthesis techniques such as solvothermal reaction in solution or solid state reaction in the absence of solvent. See, for example, U.S. Pat. No. 9,012,244, incorporated herein by reference. A transition metal based MOF, for embodiments using only a first transitional metal, a monometallic MOF, will be derived from a mixture containing stoichiometric amount of the transition metal salt and multidentate organic ligands. The stoichiometric amount refers to the total positive charges of the transition metal ions in the said salt are equivalent to the total negative charges in the corresponding organic ligand. The transition metals used to prepare monometallic MOFs are those which can form bimetallic alloy with platinum with enhanced catalytic activity, including but not limited to cobalt, nickel, iron, copper, and yttrium. Typically, the salts of these transition metals such as nitrate, acetate, chloride, etc. are used for solvothermal or solid state reaction. The examples of the transition metal salts include, but not limited to, $Co(NO3)2$, $Co(OAc)2$, $Ni(NO3)2$, $Ni(OAc)2$, $FeCl2$, $Fe(OAc)2$, $Fe(NO3)2$, $Cu(NO3)2$, $Cu(OAc)2$, $Y(NO3)3.5H2O$ etc. For solvothermal reaction, the concentration of the metal solution typically ranges from 0.1 mol/L to 1.0 mol/L. More preferably, the concentration of the metal solution typically ranges from 0.3 mol/L to 0.4 mol/L. For solid state synthesis, the metal salt will be grounded to fine powder before mixing with organic precursors.

Parallel to the transition metal precursors, organic ligand will also need to be prepared. For solvothermal synthesis, the organic ligand is dissolved into the organic solvent to prepare the ligand solution. In a preferred embodiment, the organic ligands in the current invention include a multidentate compound(s) containing nitrogen which can ligate with transition metal ions in the said transition metal salts, such as imidazolate, pyrazolate, tetrazolate ligands. Such ligands can interact with said transition metal ions to form catalytically active sites during thermal activation. Optionally, the organic ligands do not contain nitrogen but containing other ligation group such as carboxylate can also be used. The concentration of the ligand in the solution is generally determined by the stoichiometric ratio to the metal content in the solution and the final composition of the MOF material. For example, if the final metal-to-ligand ratio in the MOF structure is 1:2, then the molar concentration of the ligand should be twice of that of the metal in the final mixture after the metal and ligand solutions are mixed. For solid state synthesis, the organic ligand will be mixed with the stoichiometric amount of said metal salt through mechanic mixing and milling, before subjecting to reaction in sealed autoclave under elevated temperature.

An alternative step 1b, involves preparation of bimetallic MOF through solvothermal synthesis or solid state synthesis. The reaction mixture before step 1a can be added with a second transition metal salt with the sum of total charges from the metal ions of the first and second transition metal salts equal to that from the organic ligand after the reaction of forming MOF. In a preferred embodiment, the oxidation state of the metal ion in the second transition metal salt is equal to that of metal ion in the first transition metal salt. In yet another preferred embodiment, the molar percentage of the second metal salt ranges 50% to 99% of the combined molarity of first and second metal salts. Similar to approach 1a, the salts of transition metals that can form bimetallic or trimetallic alloy with Pt will be used. In addition, the salt of a second transition metal could also be used to produce high porosity. Such transition metal is generally removable through high temperature reduction and vaporization, for example, zinc. The example of such salts include $Zn(NO3)2$, $Zn(OAc)2$, etc. The organic ligand for the preparation of bimetallic MOF should be the same as the said ligands for the preparation of monometallic MOF.

The synthesis of bimetallic MOF can be synergic or sequential. For synergetic synthesis, both first and second transition metal complexes are mixed together in solution or solid before reacting with the organic ligand. The amount of organic ligand needed is determined by the stoichiometric ratio of the total amount of transition metal salts of both first and second transition metals in order to completely form the bimetallic MOF.

For sequential synthesis, the bimetallic MOF is prepared by two separate stages. In the first stage, a monometallic MOF is prepared according to the synthesis method described by Approach 1a. The MOF thus prepared is subsequently mixed with the solution or mixture of another transition metal complex and ligand and undergo through second solvothermal or solid state synthesis. The second MOF is thus formed over the particle of the first MOF.

In a preferred embodiment, the molar ratio of the first transition metal salt to the second metal salt should be in the range of 1:99 to 1:1. In the more preferred embodiment, the said molar ratio should be in the range of 1:20 to 1:3. The mixture will subsequently undergo the solvothermal or solid state reaction to form a bimetallic MOF.

In another alternative step of a method, in step 1c the monometallic MOF produced from step 1a can be mixed, for example mechanically, with another monometallic MOF to form a bimetallic MOF mixture. Approach 1c represents an alternative route of making bimetallic MOF. It uses the method of approach 1a to prepare the first monometallic transition MOF and the second monometallic transition metal MOF before combining said MOFs together through mechanic mixing such as ball-milling and other methods known to the skill of the art. In one embodiment, a third MOF may be used to form a trimetallic alloy.

In a second step, a thermal treatment is applied to convert the MOF into a transition metal-nitrogen-carbon composite. The monometallic and bimetallic MOFs produced from Step 1 will be subjected to high temperature treatment under the inert or reductive environment. Such treatment will partially decompose and carbonize the MOF materials. This treatment serves multiple purposes: a) forming TM/N/C composite by converting organic carbon and nitrogen to graphitic C and N through high temperature pyrolysis, b) reducing a fraction of first transition metal ion to metallic state; c) improving the electron conductivity of the framework materials by carbonize the organic ligands so that the charge can be more effectively transferred to and from the catalytic active site during the electrochemical reaction, and d) removing volatile second transition metal and forming more porosity and surface area. During such treatment, the transition metal ion in the first MOF will be converted to form zero valence metal, metal carbide and metal nitride particles, and to form TM/N/C composition in which the transition metal ions are individually dispersed through interaction with graphitic nitrogen and carbon converted from the organic ligands. Meanwhile, the transition metal ion in second MOF will be reduced to metal and subsequently vaporized under the elevated temperature. It will be appreciated that the first transition metal and the second transition metal should be selected such that the second transition metal has a lower vaporization temperature than the first transition metal and the vaporization temperature is below 1050° C.

The thermal conversion of the MOF material is generally conducted in a controlled environment, such as a sealed reactor or a flow reactor surrounded by heating element. In the preferred embodiment, the treatment is carried out inside of a tubular reactor under the constant flow of carrier gas surrounded by temperature controlled furnace.

In step 2a of FIG. 1, the MOF produced from step 1a) will be thermally treated. In alternative second step, step 2b of FIG. 1, the bimetallic MOF produced from step 1b) will be thermally treated.

The "high temperature" thermal conversion typically ranges from 600° C. to 1050° C. The preferred temperature range depends on the process step. For process step 2a), the temperature ranges from 600° C. to 950° C. in a preferred embodiment. For process step 2b), the temperature ranges from 850° C. to 1050° C. in a preferred embodiment. The thermolysis time should also be controlled. According to the present embodiment of invention, the thermal treatment time should be controlled between 30 minutes to 3 hours. In the preferred embodiment, the time under the treatment of temperature should be 60 minutes to 90 minutes. At the end of thermal treatment, all the organic ligands are converted to the carbonaceous materials decorated with nitrogen embedded in the graphitic planes.

Another condition for thermal treatment should be carefully controlled is the chemical composition of the carrier gas. In one embodiment of the invention, the carrier gas should be inert gases such as Ar or He, or to some degree, less inert such as nitrogen. In another embodiment of the invention, the carrier gas should be reductive and containing nitrogen. The examples of such reducing carrier gas include, but are not limited to, NH3, pyridine, acetonitrile, etc. At the end of thermal treatment, all the MOFs are converted to a mixture of zero valence metal, metal carbide and metal nitride particles, and TM/N/C composite.

A third step provides infiltration of platinum into the material from step 2. In FIG. 1, step 3, after the heat treatment from Step 2a or 2b, the TM/N/C composite will be subjected to an acid washing through which a fraction of reduced metal will be removed. The acid wash controls the amount of first transition metal and to removes the residual second transition metal (for bimetallic MOF embodiments). In a preferred embodiment, 10% to 60% of the first transition metal in the thermally treated MOF will be removed by said acid wash. A variety of inorganic acids can be used to dissolve the excess amount metals in the material from Step 2 by simply immersing the pyrolyzed MOF material in the acid solution. The acid for this application include hydrochloric acid, sulfuric acid, nitrate acid, and other acid known to dissolve metals. The concentration of the acid can be in the range of 0.1 molar 2 molar concentration. In a preferred embodiment, the concentration of the acid ranges from 0.5 molar to 2 molar. The acid treatment temperature can range from the ambient to as high as 80° C. The acid treatment time ranges from 0.5 hour to 72 hours. Followed by acid washing, the sample will be dried to remove the excess solution.

Following the acid wash, a platinum precursor in the form of organometallic complex or salt will be added to the composite. Two parallel approaches, 3a) and 3b), can be used to add Pt into the composite. According to one embodiment of the invention of step 3a), the acid washed and dried material have platinum added by platinum precursors in the form of organometallic complex or inorganic salt including, but not limited to, Trimethyl(methylcyclopentadienyl)platinum (C9H16Pt), Pt(AcAc)2, HPtCl6, Pt(NH3)4(NO3)2, etc. Such platinum precursor is first dissolved into solution before be applied to the sample. After adding the Pt precursor, the sample is sealed inside of a vessel and heated at 40° C. to 80° C. at 30 minutes to 90 minutes before being dried in a vacuum oven. The amount of platinum precursor applied is determined by the final Pt loading after the catalyst is processed. In a preferred embodiment, the final platinum loading is in the range between 1 wt. % to 20 wt. %. In a more preferred embodiment, the final platinum loading is in the range between 2 wt. % to 10 wt. %. Such loading is substantially lower than the current Pt/C catalyst which has the range of 20 wt. % to 40 wt. %.

In the embodiment of step 3b), a platinum precursor in the form of organometallic complex will be added to the composite after the acid wash and drying of the composite. Platinum precursors in the form of organometallic complex including, but not limited to, trimethyl(methylcyclopentadienyl)platinum (C9H16Pt), 2,4-cyclopentadien-1-ylmethyl)(trimethyl)platinum (C9H16Pt), (methylcyclopentadienyl)trimethylplatinum (C9H16Pt), are dissolved in liquid aliphatic amine before being applied to the said composite. In a preferred embodiment, the organometallic platinum precursor is trimethyl(methylcyclopentadienyl)platinum and the aliphatic amine is oleylamine. The amount of platinum precursor applied is determined by the final Pt loading after the catalyst is processed. In a preferred embodiment, the final platinum loading is in the range between 1 wt. % to 20 wt. %. In a more preferred embodiment, the final platinum loading is in the range between 2 wt. % to 10 wt. %.

In a fourth step, the infused material is activated. The fourth step contains two parallel approaches, 4a) and 4b) respectively. In one embodiment, the infused material is activated by reduction. In step 4a) of FIG. 1, the material derived from Step 3 is heat treated in the reducing gas environment at elevated temperature so that Pt-TM bimetallic alloy microcrystallites will be formed over the TM/N/C composite. According to the current invention, the preferred heat treatment operates in two temperature ranges. The first temperature range is from 120 to 250° C. and the heat treatment duration is between 15 minutes to two hours. In a more preferred embodiment, the treatment temperature ranges from 150 to 200° C. and the treatment time ranges from 30 minutes to one hour. Following such treatment, the sample will be subjected to the second high temperature treatment in reducing gas flow. In a preferred embodiment, such treatment should have temperature ranging from 600° C. to 800° C. in the duration between 15 to 60 minutes. The reducing gas can be hydrogen, ammonia and those known in the field of art. Under such condition, the platinum in the precursor will be first reduced to Pt metal within the first heat treatment temperature range which will subsequently form alloy microcrystallites with the reduced first transition metal particles within the second heat treatment temperature range.

In a separate embodiment for the step 4b) of the fourth step, the TM/N/C composite infused with organometallic platinum in aliphatic amine prepared according to step 3b) is first heat treated from 120 to 250° C. and the heat treatment duration is between 15 minutes to two hours without the presence of any reductive gas. Following the first heat treatment, the composite will be washed with organic solvent to remove excess aliphatic amine before being dried. The dried composite will then subjected to the second high temperature treatment in reducing gas flow. In a preferred embodiment, such treatment should have temperature ranging from 600° C. to 800° C. in the duration between 15 to 60 minutes. The reducing gas can be hydrogen, ammonia and those known in the field of art. Under such condition, the platinum in the precursor will be first reduced to Pt metal within the first heat treatment temperature range which will subsequently form alloy microcrystallites with the reduced first transition metal particles within the second heat treatment temperature range.

In an alternative embodiment, rather than thermolysis step 2, (step 2a or 2b of FIG. 1), a platinum precursor can be added into monometallic MOF through an infiltration method in step 5 of FIG. 1. In such approach, the platinum precursors in the form of organometallics or salt is first dissolved into the solvent and subsequently infused into the porous MOFs. During the infusion, the MOFs are first subjected to vacuum to remove air in the cavity before being submerged in the solvent containing the platinum precursors. In a preferred embodiment, the concentration of the platinum precursor is controlled so that the weight fraction of platinum in the final Pt/MOF composite after infiltration and drying is equivalent to 2 wt. % to 20 wt. %. According to current invention, the MOF should be dried free of solvent and under vacuum before being infused by the platinum precursor solution. After the infiltration of platinum solution, the sample will be dried at ambient temperature under vacuum.

The material produced in Step 5 of FIG. 1 will be subjected to high temperature in a reducing gas environment in Step 6). Under such condition, both platinum and transition metal in MOF will be reduced and form bimetallic alloy particles. Meanwhile, the nitrogen and carbon in the organic ligand of MOF will be converted to graphitic C and N, which will form TM/N/C moiety with a fraction of transition metal ion in MOF. In a preferred embodiment, such treatment should have temperature ranging from 600° C. to 800° C. in the duration between 15 minutes to two hours. The reducing gas can be hydrogen, ammonia and those known in the field of art. The result is the formation of a bimetallic Pt-TM alloy microcrystallites supported over TM/N/C composite which are formed through the complete conversion of the N-containing organic ligand in the presence of excess transition metal from the decomposition of MOF.

Figure 2:
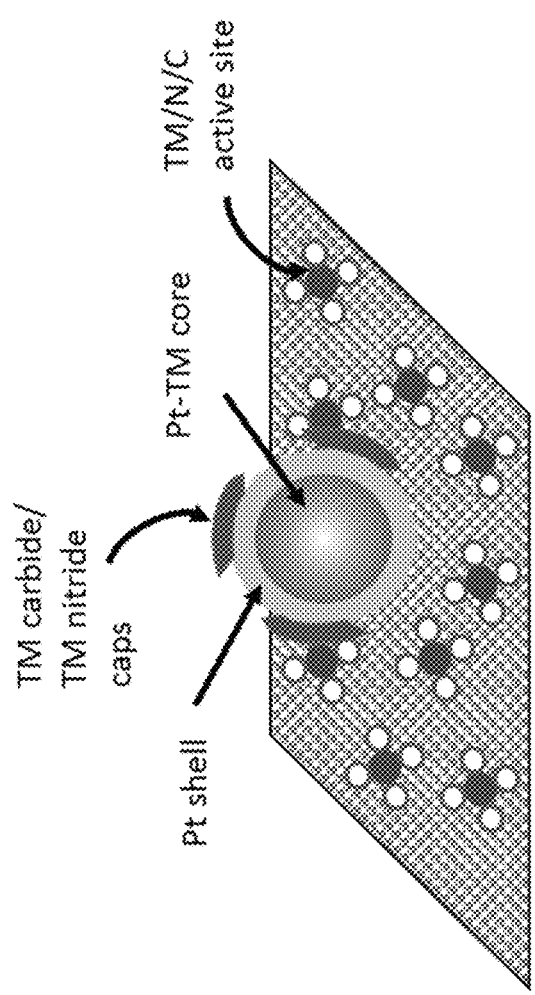
FIG. 2 The illustration of the representative catalytic site structure of the catalysts prepared according to the current invention.

Shown in FIG. 2, the electrode catalysts prepared from embodiments described herein have unique structure compared to that of prior art in the following aspects: a) The Pt-TM crystallites have Pt-TM core dominated with TM and Pt only shell, as is expressed by the drawing in FIG. 2; b) the Pt-TM crystallites have dimension typically ranges from 2 nm to 9 nm; c) the Pt-TM crystallites are partially capped by thin layers of TM carbide and TM nitride; and d) the Pt-TM crystallites are situated over the composite surface decorated by TM/N/C catalytic active sites. Not limited by the theory, such catalyst offers a core-shell structure of Pt-TM alloy crystallite which is known to promote highly efficient oxygen reduction reaction. Furthermore, such Pt-TM alloy crystallite situates over the support with TM/N/C which is also known to promote oxygen reduction reaction. As are evidenced by the examples, the proximity between Pt-TM crystallite and TM/N/C active sites produces a synergetic interaction that offers higher catalytic activity and durability than the individual components. Furthermore, the TM carbide and nitride are known more robust against oxidative dissolution. The TM carbide and nitride caps on the Pt-TM crystallites add the protection to the catalyst particles against oxidative dissolution therefore improve the catalyst durability.

The electrode catalysts prepared from embodiments described herein have several advantages over that of prior art in the following aspects: a) High activity at lower Pt loading. The catalysts prepared according to the current invention have produced equal or higher performance at substantially lower platinum metal loading, compared to the conventional Pt catalysts. Therefore they lower the catalyst cost in fuel cell; b) High catalyst durability. The catalysts prepared according to the current invention have demonstrated higher catalyst stability than the non-precious metal catalyst and conventional Pt catalyst when tested under accelerated aging condition in fuel cell. Therefore, they offer higher catalyst durability in fuel cell.

Another aspect relates to a method of making a catalyst using as an intermediary a bimetallic MOF. A bimetallic MOF is prepared which is composed of two different transition metal ions. The bimetallic MOF can be prepared by sequential crystallization and co-crystallization in solution or solid state; or by mechanic mixing of two monometallic MOFs. According to current invention, one of the transition metal is volatile at the thermolysis temperature of less than 1050° C., such as zinc. The other transition metal is not volatile and is prone to form catalytic active center either by itself with nitrogen-carbon composite and with Pt to form alloy, such as, but not limited, to Co, Fe, Ni, Cu, Y, etc.

In another aspect, a method is provided to prepare MOF materials containing a platinum compound as the precursors to form a low Pt catalyst. Both organometallic platinum and inorganic platinum salt can be used to filtrate or blend with MOF. Due to the high porosity and periodic cavity existing inside of the MOF crystals, the platinum compound can be infused or encapsulated inside of the MOF cavity or in the immediate vicinity outside of the MOF cavity. Such platinum is close to the transition metal ions serving as the secondary building unit of the MOF. Not limited by the theory, such proximity can promote the formation of platinum-transition metal alloy catalyst during the heat-treatment process. Such catalyst will have uniform distribution of the bimetallic active site throughout the catalyst body, leading to better catalytic activity according to the current invention.

In another embodiment, the prepared MOFs are activated as precursors through thermal treatment such as high temperature thermolysis in an inert or reducing atmosphere. The high temperature treatment will lead to decomposition and reaction between different components of the MOF precursor and to form a composite containing transition metal-nitrogen-carbon, "TM-N—C". Such composite was found catalytically active in promoting ORR. The high temperature treatment will also lead to the removal of volatile transition metal, thus generating more porosity at the same time. Furthermore, the thermal treatment will also improve the electronic conductivity which is critical for the electrocatalysis. The TM-N—C composite thus produced possesses high surface area and porosity with pore size dominantly distributed at micropore region (diameter less than 2 nanometers). Furthermore, the transition metal based active sites are uniformly distributed throughout the composite.

In one embodiment, the method includes further processing thermally treated MOFs with controlled acid wash to remove certain fraction of the non-volatile transition metal. After this removal, a platinum precursor will be added to the acid-washed composite. The platinum precursor added composite is first reduced in reducing atmosphere such as hydrogen flow at medium temperature, followed by a second heat treatment at high temperature in reducing atmosphere such as ammonia. Such treatment will lead to the reduction of platinum precursor to metallic Pt which subsequently to react with transition metal (TM) to form Pt-TM alloy catalyst over TM-N—C active site decorated composite.

In another embodiment, the method includes further processing thermally treated MOFs with controlled acid wash to remove certain fraction of the non-volatile transition metal. After this removal, a platinum precursor is dissolved in aliphatic amine such as oleylamine before being applied to the acid washed composite. The composite after platinum precursor will be heated to the medium temperature and the platinum precursor will be reduced to metallic crystallites by the aliphatic amine. After washing away the excess unreacted aliphatic amine, the composite will be heated to high temperature in reducing gas such as ammonia. Such treatment will lead to the formation of Pt-TM alloy catalyst over the composite decorated with TM-N—C active sites.

In one embodiment, the Pt-transition metal composite catalyst offers higher catalytic activity than traditional platinum-transition metal catalyst with the same platinum loading. Furthermore, such Pt-TM catalyst also offers excellent catalytic durability when it is subjected to multiple electropotential cycling under the accelerated stress test condition. The improvements in activity and durability are illustrated by the examples provided in the current invention.

One embodiment relates to a new method of preparing the electrode catalysts for the oxygen reduction reaction that contains mainly transition metals, carbon, nitrogen and very low concentration of platinum.

One embodiment relates to methods of prepare bimetallic MOF which is composed by two different transition metal ions, one TM is selected from Zn, the other is selected from TMs that can form catalytic active center by itself with nitrogen-carbon composite and with Pt to form alloy.

One embodiment relates to methods of preparing MOF materials containing the platinum compound as the precursors to form low Pt catalyst.

One embodiment relates to methods of selecting and preparing metal organic framework material linked together by transition metal ions and nitrogen containing multidentate organic ligands where the catalytic active center by converting N-containing organic ligand to N-containing carbons binding with the transition metal during thermal activation.

One embodiment relates to methods of activating thus prepared MOFs as the precursors through thermal treatment such as high temperature thermolysis in an inert or reducing atmosphere.

In one embodiment, the method involves multiple steps including the synthesis of metal-organic framework (MOF) materials containing transition metals and organic ligands with or without nitrogen-containing functional groups, optionally adding another one or more transition metal compounds into the porous structure of the MOF materials through infiltration, optionally adding other nitrogen containing compounds into the MOF through solvent exchange or solid state mixing, heat-treating thus prepared MOF materials at the elevated temperatures in the inert gas atmosphere, optionally further heat-treat thus prepared MOFs at the elevated temperature in the presence of ammonia or other N-containing chemicals, further treating thus prepared materials with acids to control the transition metal content, adding platinum metal precursor, further treating thus prepared material under reducing gas such as hydrogen at elevated temperature.

One aspect of the current invention is to prepare porous metal-organic framework materials as the precursors for a catalyst. The general formation of such MOFs are known by several different synthetic techniques. The synthesis typically involves solvothermal reaction of the transition metal based salt with multidentate organic ligand. The current invention focuses on preparing MOFs using transition metals that can be served as the catalytic center by itself in heat-treated nitrogen-carbon composite and/or to form an alloy with platinum. Acceptable transition metals include, but are not limited to, Co, Fe, Ni, Cu, and Y. Certain embodiments also convert the organic ligands, as part of the catalyst structure, through heat treatment. In a preferred embodiment, such organic ligands typically contain nitrogen in their molecular structure, which include, but are not limited to, imidazolate, pyrazolate, and tetrazolate. Optionally, a non-N containing organic ligand can also be used for the synthesis of MOFs as the precursor for the electrocatalyst preparation through high temperature thermolysis.

One embodiment relates to methods of further processing thermally treated MOFs with controlled acid wash to remove certain fraction of the non-volatile transition metal, before adding Pt precursor followed by a medium temperature reduction in hydrogen to form Pt crystallites, then a high temperature treatment in ammonia to form Pt-TM crystallites.

One embodiment relates to methods of further processing thermally treated MOFs with controlled acid wash to remove certain fraction of the non-volatile transition metal, before adding a mixture of Pt precursor dissolved in aliphatic amine followed by a medium temperature reduction in aliphatic amine to form Pt crystallites. After washing off the excess aliphatic amine, the composite is subject to a high temperature treatment in ammonia to form Pt-TM crystallites.

One embodiment of methods of preparing Pt-TM catalyst with higher catalytic activity than traditional platinum-transition metal catalyst with the same platinum loading. Furthermore, such Pt-TM catalyst also offers excellent catalytic durability when it is subjected to multiple electro-potential cycling under the accelerated stress test condition.

Table 1 compares the catalyst performance target set for Year 2020 by U. S. Department of Energy (US DOE) with the embodiments of two representative Pt-TM catalysts prepared according to Example 1 and Example 2 of the current invention

TABLE 1

Comparison of US DOE 2020 catalyst performance targets with the test results obtained over the Pt-TM catalysts prepared according to Example 1 and 2.

| | Units | DOE 2020 Targets | Example 1 | Example 2 |
|---|---|---|---|---|
| Pt mass activity @ 900 $mV_{iR-free}$ | $A/mg_{PGM}$ | 0.44 | 0.915 | 1.59 |
| PGM total loading (both electrodes) | $mg/cm^2$ | <0.125 | 0.039 (Cathode) | 0.039 (Cathode) |
| MEA performance @ 800 mV (air) | $mA/cm^2$ | ≥300 | 287 | 300 |
| MEA performance @ 675 mV (air) | $mA/cm^2$ | ≥1000 | 806 | 830 |
| Loss in catalytic (mass) activity | % loss | <40 | 39 | 85 |
| Loss in performance at 0.8 $A/cm^2$ | mV | <30 | 6 | 47 |
| Loss in performance at 1.5 $A/cm^2$ | mV | <30 | 12 | 56 |

The process of preparing electrocatalyst according to the embodiments of the current invention can be further elucidated by the following examples;

Sample Preparations

Example 1

Synthesis of a monometallic MOF based low Pt catalyst: Stage a) synthesis of cobalt methylimidazolate framework, Co(mIm)2; Co(NO3)2.6H2O (2.601 g, 10 mmol) was dissolved in methanol (50 mL) and a solution of 2-methylimidazole (1.642 g, 20 mmol) in methanol (50 mL) was added. The mixture was stirred at room temperature for 0.5 h and then, kept at room temperature for at least 12 h. The violet crystals were collected, washed with methanol for 3 times, and dried at 50° C. for 24 h. The MOF thus prepared was pyrolyzed under Ar atmosphere in a tubular furnace at 800° C. for 1 h followed by an acidic wash in 0.5 M H2SO4 under sonication for 0.5 h. The sample was then dried overnight. Trimethyl(methylcyclopentadienyl)platinum(IV), (C9H16Pt) with weight equivalent to 5 wt. % of dried pyrolyzed sample was dissolved into oleylamine and applied to the pyrolysis sample. After the drying, oleylamine added sample was kept in an oil bath at 180° C. for 1 h. After rinsing the sample with hexane and dried at 50° C. overnight, the sample was further reduced under flowing NH3 at 700° C. for 0.5 h to form the low Pt—Co fuel cell catalyst, named as ZIF67+Pt.

Example 2

Synthesis of a bimetallic MOF based low Pt catalyst: Stage a) synthesis of zinc methylimidazolate framework, $Zn(mIm)_2$; 2-methylimidazole (13.05 g) was dissolved in methanol (400 ml), stirred for 10 mins, and a solution of $Zn(NO_3)_2.6H_2O$ (5.85 g) in methanol was added. The mixture was stirred at room temperature for 10 mins to give a heterogeneous mixture which was then kept for 1 h. The white crystal was collected and washed with methanol 3 times. Stage b) one gram of $Zn(mIm)_2$ from Stage a is added to 2-methylimidazole (10 g) dissolved in 500 ml methanol under sonication to give a homogeneous solution. A cobalt nitrate solution was prepared by dissolving $Co(NO3).6H2O$ in 50 ml water. The concentration of the cobalt nitrate was calculated so that the molar ratio of Co/Zn in the final bimetallic MOF was 0.16. The cobalt nitrate solution was poured into aforementioned Zn(mlm)2/methylimidazole solution. The mixture was stirred for 1 h, and then kept in still for 12 h. The bimetallic MOF crystals thus formed were washed with methanol 3 times and dried at 50° C. for 24 h. The MOF thus prepared was pyrolyzed under Ar atmosphere in a tubular furnace at 800° C. for 1 h followed by an acidic wash in 0.5 M H2SO4 under sonication for 0.5 h. The sample was then dried overnight. Trimethyl(methylcyclopentadienyl)platinum(IV), ($C_9H_{16}Pt$) with weight equivalent to 5 wt. % of dried pyrolyzed sample was dissolved into oleylamine and applied to the pyrolysis sample. After the drying, oleylamine added sample was then kept in an oil bath at 180° C. for 1 h. After rinsing the heat activated sample with hexane and dried at 50° C. overnight, the sample was reduced under flowing NH3 at 700° C. for 0.5 h to form the low Pt—Co fuel cell catalyst, named as 8@67-0.16+Pt.

Example 3

Synthesis of a bimetallic MOF based low Pt catalyst, 8@67-0.05+Pt, using the same procedure as shown by Example 2 except that the molar ratio of Co/Zn in the bimetallic MOF was kept at 0.05 to 0.95.

Example 4

Synthesis of a bimetallic MOF based low Pt catalyst, 8@67-0.26+Pt, using the same procedure as shown by Example 2 except that the molar ratio of Co/Zn in the bimetallic MOF was kept at 0.26 to 0.74.

Example 5

To demonstrate the improvement of current invention over the traditional catalyst, a traditional electrocatalyst, XC-72+Pt, was prepared by applying equal amount of Pt used in Example 1 over conventional amorphous carbon support, XC-72. In a typical procedure, Trimethyl(methylcyclopentadienyl)platinum(IV), ($C_9H_{16}Pt$) with weight equivalent to 5 wt. % of XC-72 was dissolved into methanol and applied to XC-72. The following platinum reduction steps were the same as the procedure shown by Example 1.

Catalyst Testing

Example 6

Figure 3:
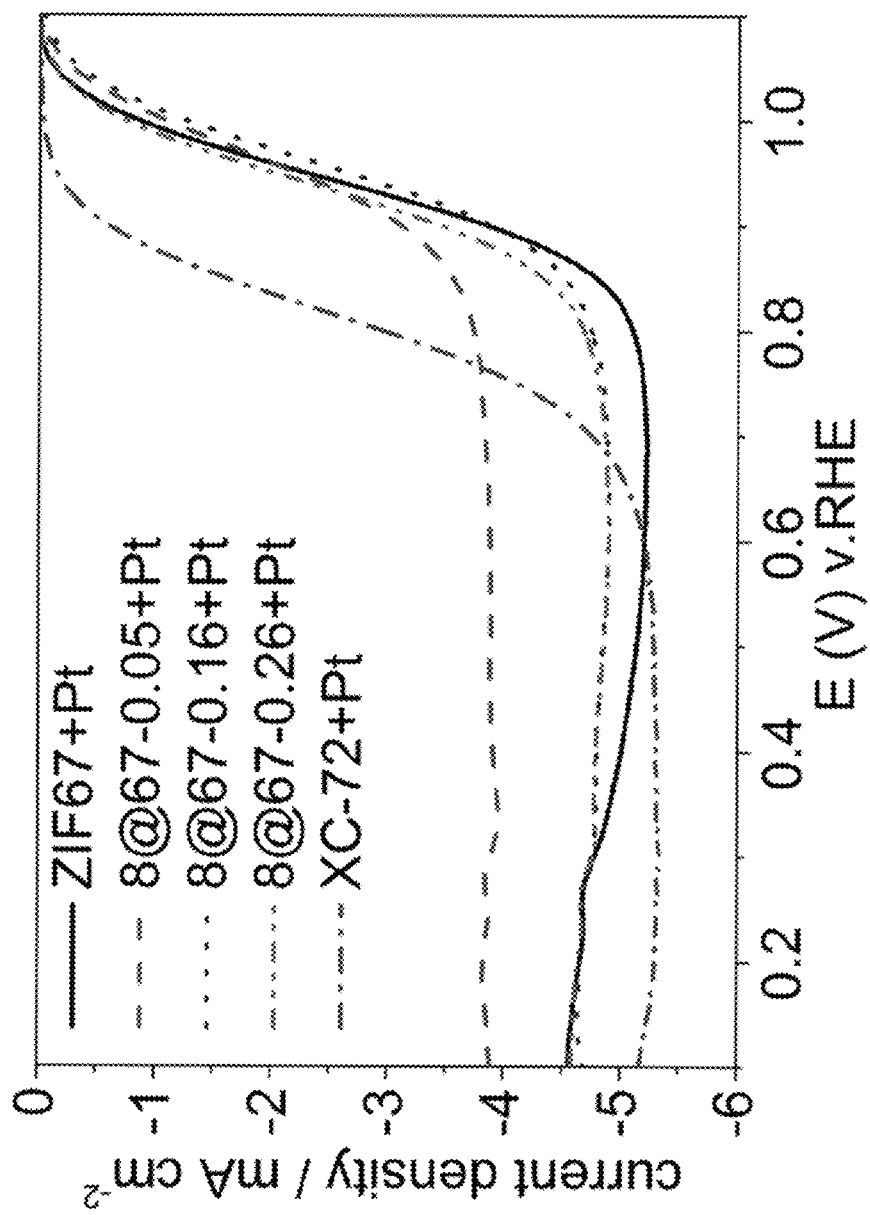
FIG. 3. The current densities as the function of polarization potential measured by rotating disk electrode method for low-Pt catalysts prepared according to Example 1 though Example 5.

The low-Pt catalyst samples prepared according to Example 1 through Example 5 were ground using a mortar and pestle until they formed fine powders. About 5 mg of each sample was put in a 10 mL vial to prepare a catalyst ink by mixing 5% Nafion solution and methanol as the solvent. The prepared inks were magnetic stirred for several days until they became smooth and easy to deposit in a glassy carbon (GC) electrode. The thus prepared inks were used to test the electro-catalytic activities of the materials using the rotating disk electrode (RDE) technique. Each ink was deposited on the GC electrode using a micropipette, targeting a weight per unit area of 600 µg/cm² of the dry sample. The catalyst inks were tested using 0.1 M $HClO_4$ or 0.5 M $H_2SO_4$ aqueous solution as the electrolyte, an $Hg/HgSO_4$ reference electrode with a 0.5M $H_2SO_4$ solution and a gold counter electrode. The electrolyte was purged with Argon gas for at least 30 minutes, and a voltammogram was recorded for background subtraction. A second voltammogram was recorded after the electrolyte was saturated with oxygen gas for at least 30 minutes. FIG. 3 shows the ORR activities of all the samples in the form of current density—potential polarization. As can be seen, all the low-Pt catalysts derived from monometallic MOF and bimetallic MOF showed significantly higher onset and halfwave potentials (as high as 90 mV in difference) compared to conventional carbon black supported catalyst, XC-72+Pt, of similar platinum loading.

Example 7

Figure 4:
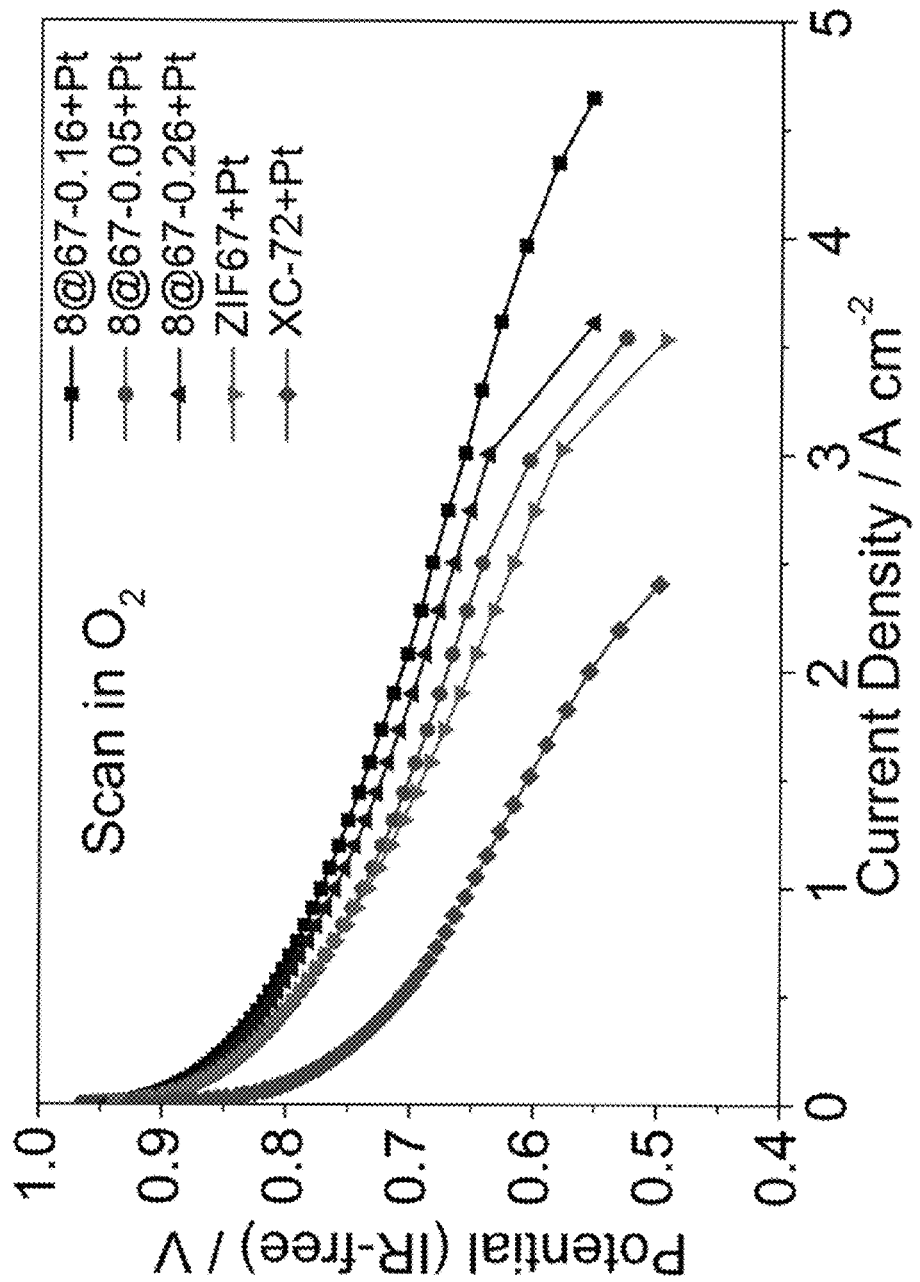
FIG. 4 The current-voltage polarization studies of fuel cells with MEAs containing cathodic catalysts prepared according to Example 1 through Example 5 using hydrogen and oxygen as feed gases.

The low-Pt catalyst samples prepared according to Example 1 through Example 5 were tested in fuel cell using oxygen and hydrogen. To prepare fuel cell cathode, the catalysts prepared according Example 1 through Example 5 were first grinded to fine powders. Each catalyst powder was mixed with 5% Nafion solution and methanol to prepare ink. The prepared ink was magnetic stirred and subsequently applied to the surface of 5 cm² carbon paper (Sigracet 25 BC) at the loading equivalent to 0.039 mgPt/cm². The catalyst coated carbon paper served as the cathodic gas diffusion electrode (GDE) and was hot-pressed to a Nafion® membrane (N-211) with an anodic GDE on the opposite side to form a membrane electrode assembly (MEA). Such MEA was placed inside of a fuel cell and tested under the current-polarization condition. During the test, the cathode was under one-bar oxygen at the flowrate of 200 ml/min. Similarly, the anode was under one-bar hydrogen at the flowrate of 200 ml/min. The fuel cell was operated at 80° C. and both oxygen and hydrogen flows were fully humidified. FIG. 4 shows the current-voltage polarization curves (iR corrected) of the MEAs with the cathode catalysts prepared according to Example 1 through 5. All the bimetallic and monometallic MOF based catalysts demonstrated higher cell potentials than the conventional catalyst at any given current density, indicating improved cathodic catalyst performance.

Example 8

Figure 5:
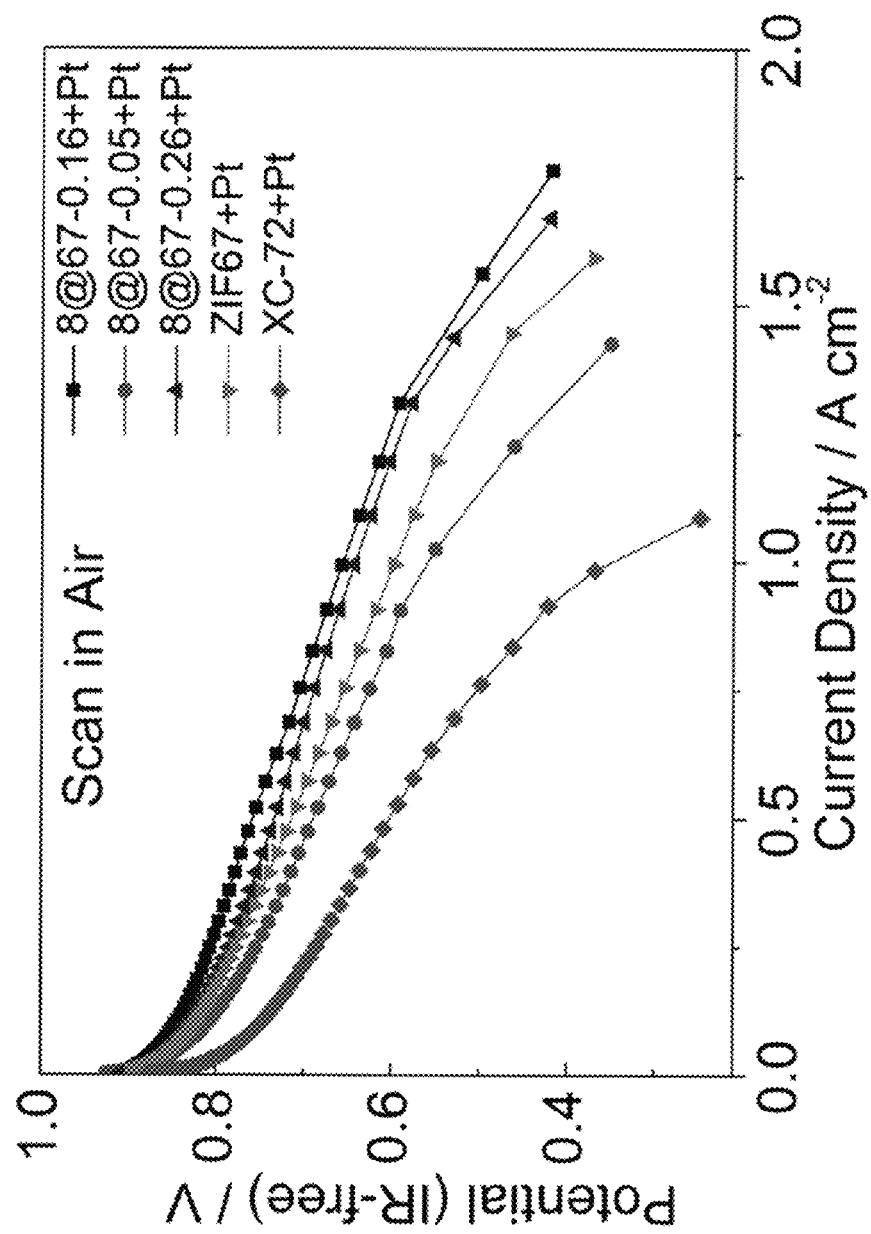
FIG. 5 The current-voltage polarization studies of fuel cells with MEAs containing cathodic catalysts prepared according to Example 1 through Example 5 using hydrogen and air as feed gases.

The low-Pt catalyst samples prepared according to Example 1 through Example 5 were tested in fuel cell using air and hydrogen. The MEA preparations and fuel cell tests follow the procedures described according to Example 7 except that oxygen was replaced by air. FIG. 5 shows the current-voltage polarization curves (iR corrected) of the MEAs with the cathode catalysts prepared according to Example 1 through 5. All the bimetallic and monometallic MOF based catalysts demonstrated higher cell potentials than the conventional catalyst at any given current density, indicating improved cathodic catalyst performance.

Example 9

Figure 6:
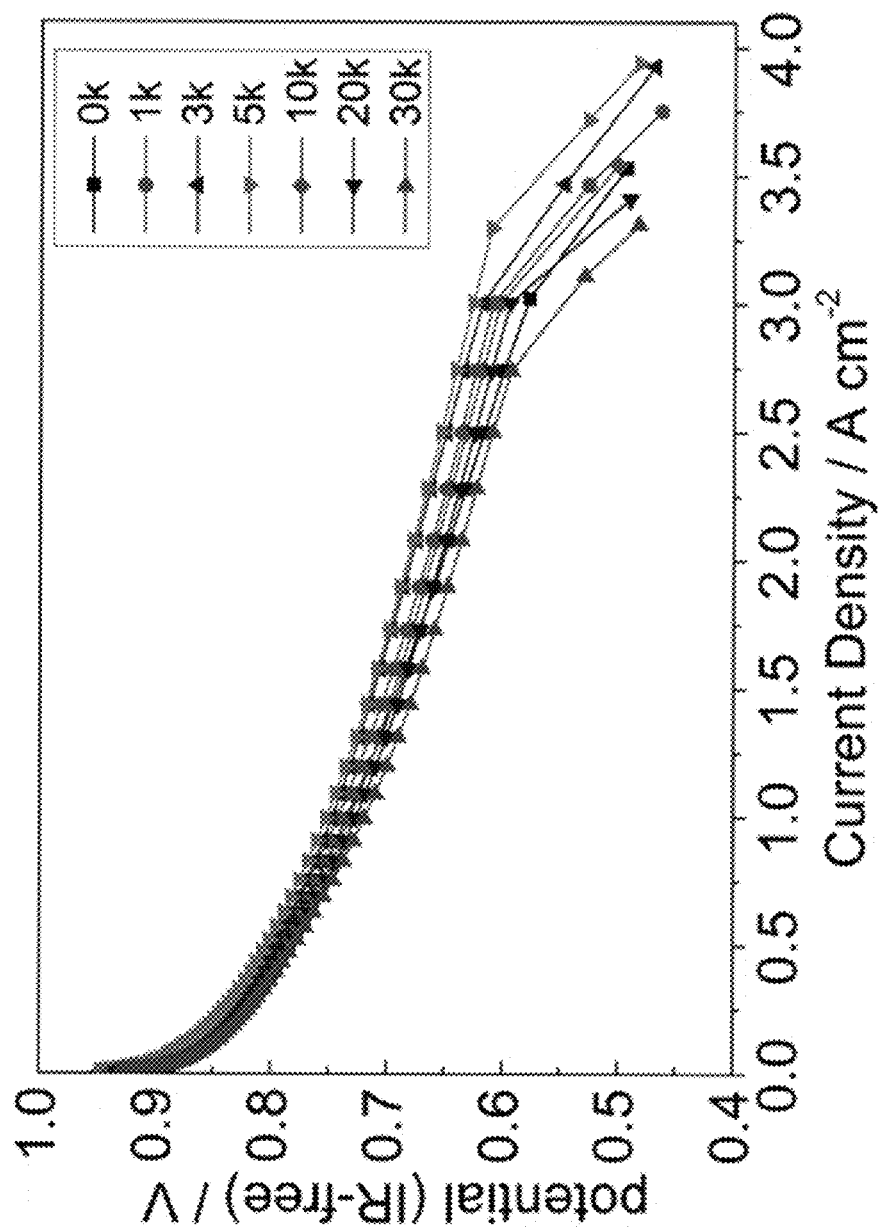
FIG. 6 The current-voltage polarizations of fuel cell with MEA containing cathodic catalyst prepared according to Example 1 at several stages after multiple voltage cycles during an accelerated stress test.

The monometallic MOF-derived low-Pt catalyst sample, ZIF67+Pt, prepared according to Example 1 was also subjected to a durability test in fuel cell. In this test, the MEA prepared according to Example 7 was installed in a fuel cell with fully humidified hydrogen flow in anode and nitrogen flow in cathode. The fuel cell potential was polarized by an external potentiostat from 0.6 to 1.0 V repeatedly in a multiple voltage cycling stress test. After 1,000, 5,000, 10,000 and 30,000 voltage cycles, the cathode gas was switched from nitrogen to oxygen and the current-voltage polarization was performed. FIG. 6 shows that only limited voltage drops were observed between the polarization curves, indicated relatively stable catalyst performance.

Example 10

Figure 7:
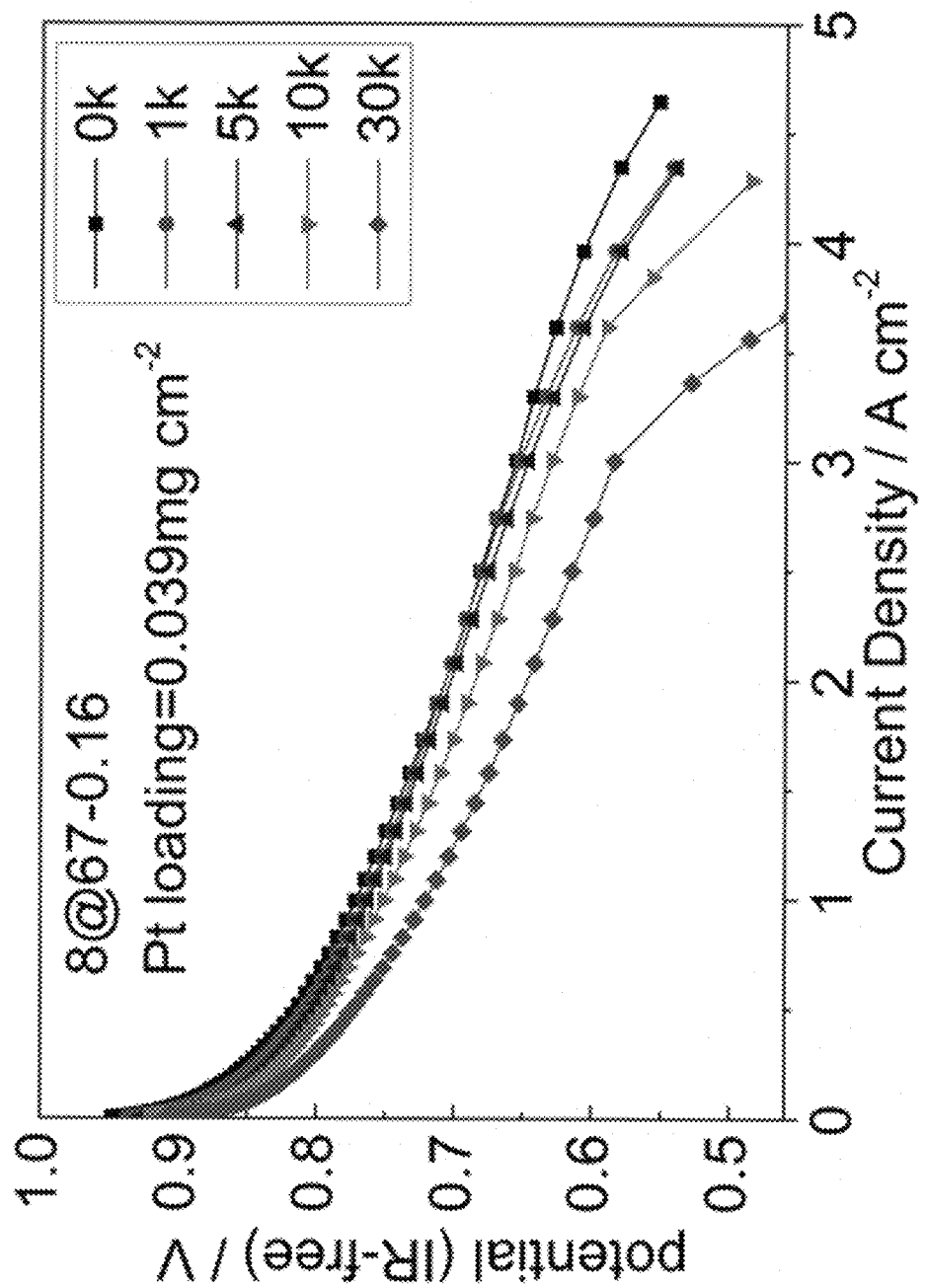
FIG. 7 The current-voltage polarizations of fuel cell with MEA containing cathodic catalyst prepared according to Example 2 at several stages after multiple voltage cycles during an accelerated stress test.

The bimetallic MOF-derived low-Pt catalyst sample, 8@67-0.16+Pt, prepared according to Example 2 was also subjected to the same durability test as described by Example 9. Similar to the observation in Example 9, FIG. 7 shows that only limited voltage drops were observed between the polarization curves, indicated relatively stable catalyst performance.

Example 11

Figure 8:
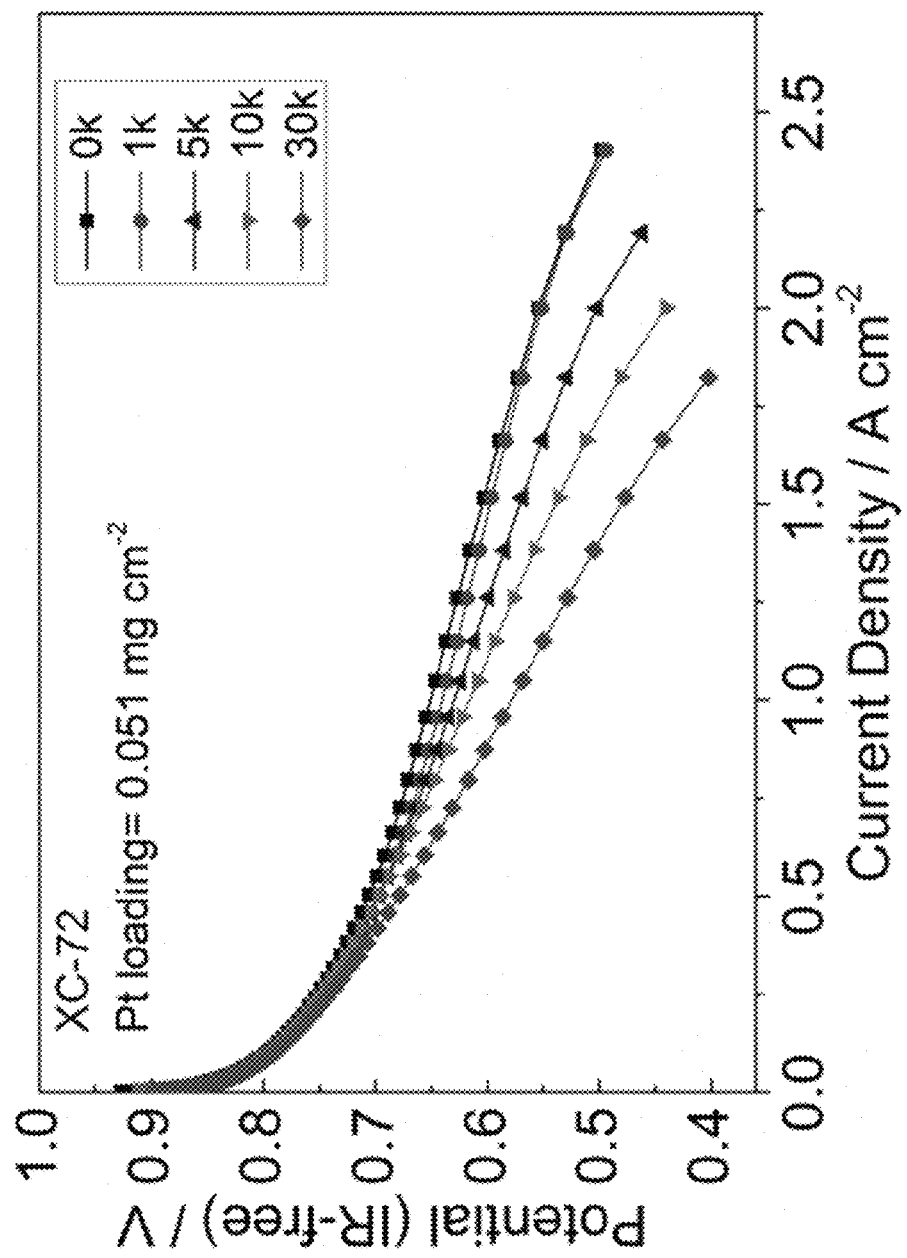
FIG. 8 The current-voltage polarizations of fuel cell with MEA containing a cathodic catalyst prepared according to Example 5 at several stages after multiple voltage cycles during an accelerated stress test.

To compare the improved durability of the catalysts prepared according to the current invention over the traditional Pt/C catalyst, a conventional catalyst, XC-72+Pt, prepared according to Example 5 was also subjected to the same durability test as described by Example 9. FIG. 8 shows that a significant voltage drops were observed between the polarization curves, indicated that the conventional catalyst is less stable than that of MOF derived catalysts demonstrated in Example 9 and Example 10.

Example 12

Figure 9:
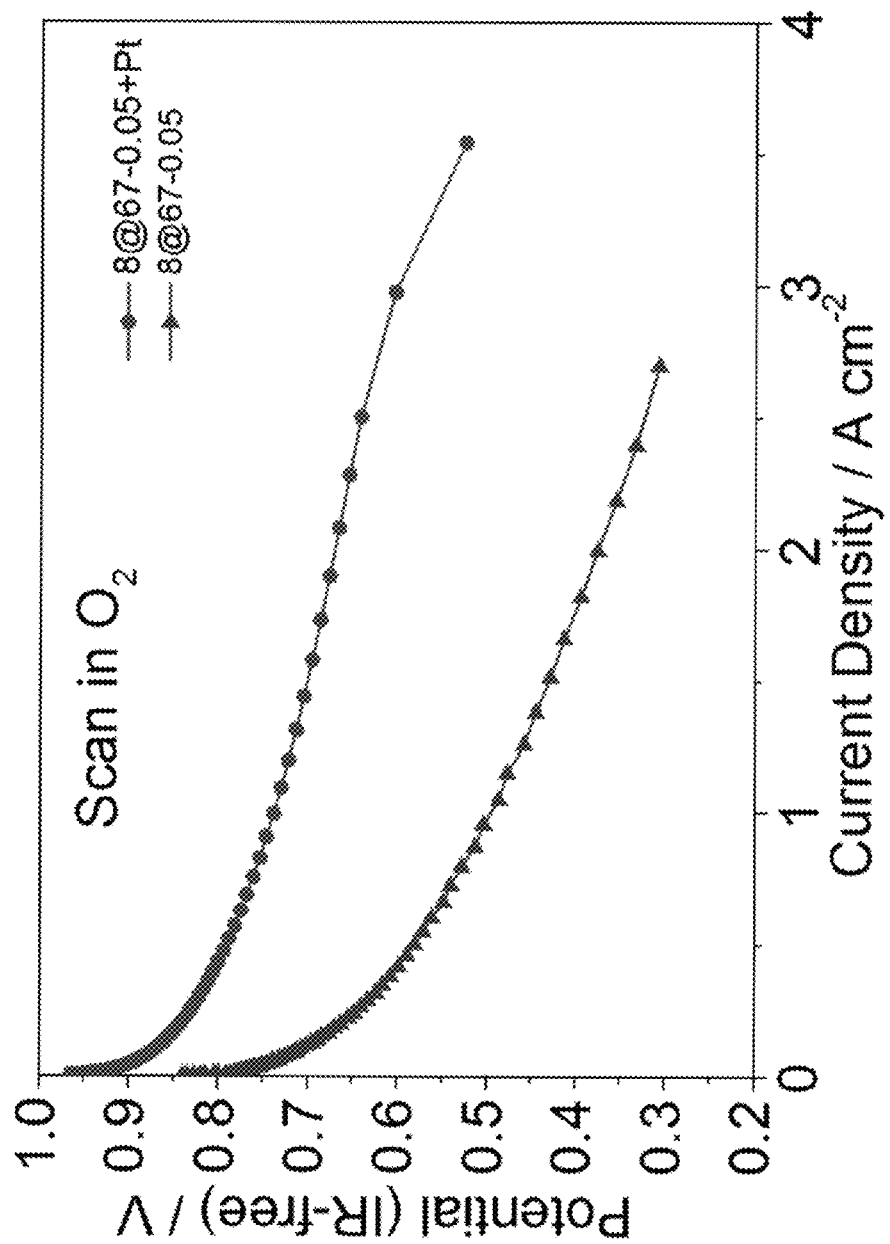
FIG. 9 The current-voltage polarization studies of fuel cells with MEAs containing cathodic catalysts prepared according to Example 3 and Example 12 using hydrogen and oxygen as feed gases.

To demonstrate that the current invention is superior over the non-precious metal catalyst, a non-precious metal catalyst 8@67-0.05 was prepared according to the similar process of the catalyst prepared according to Example 3 except without adding platinum. The catalyst 8@67-0.05 was also was prepared into a membrane electrode assembly and tested in fuel cell following the same procedure described in Example 7. FIG. 9 shows the current-voltage polarization of MEA with catalyst 8@67-0.05. For comparison, the current-voltage polarization of MEA with catalyst 8@67-0.05+Pt according to the current invention is also plotted. The current invention 8@67-0.05+Pt shows a significant improvement in cell potential over 8@67-0.05 under the same current density in the voltage-current polarization curves.

Example 13

Figure 10:
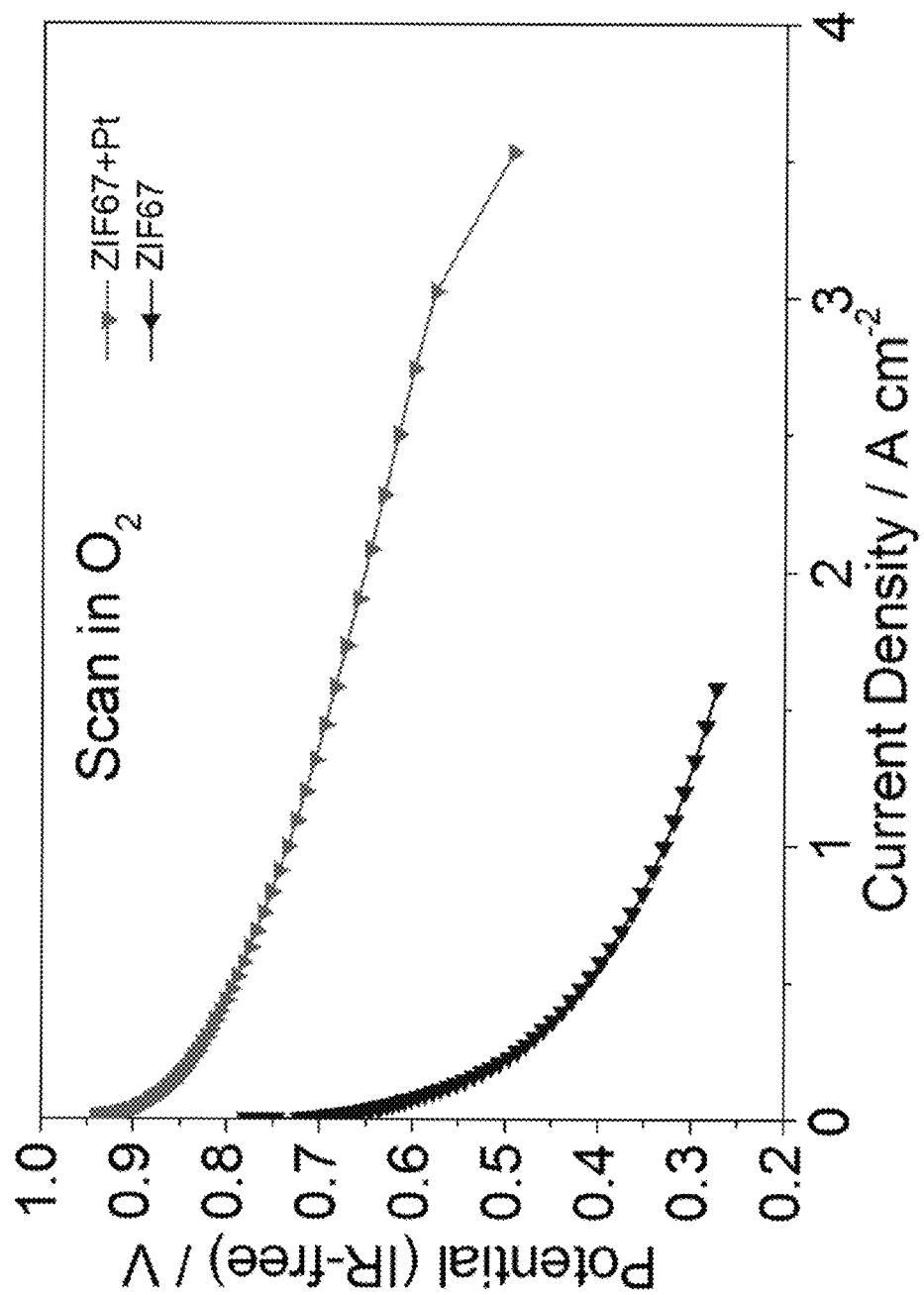
FIG. 10 The current-voltage polarization studies of fuel cells with MEAs containing cathodic catalysts prepared according to Example 1 and Example 13 using hydrogen and oxygen as feed gases.

To further demonstrate that the current invention is superior over the non-precious metal catalyst, a non-precious metal catalyst ZIF-67 was prepared according to the similar process of the catalyst prepared according to Example 1 except without adding platinum. The catalyst ZIF-67 was also was prepared into a membrane electrode assembly and tested in fuel cell following the same procedure described in Example 7. FIG. 10 shows the current-voltage polarization of MEA with catalyst ZIF-67. For comparison, the current-voltage polarization of MEA with catalyst ZIF67+Pt according to the current invention is also plotted. The current invention ZIF67+Pt shows a significant improvement in cell potential over ZIF67 under the same current density in the voltage-current polarization curves.

Example 14

Figure 11:
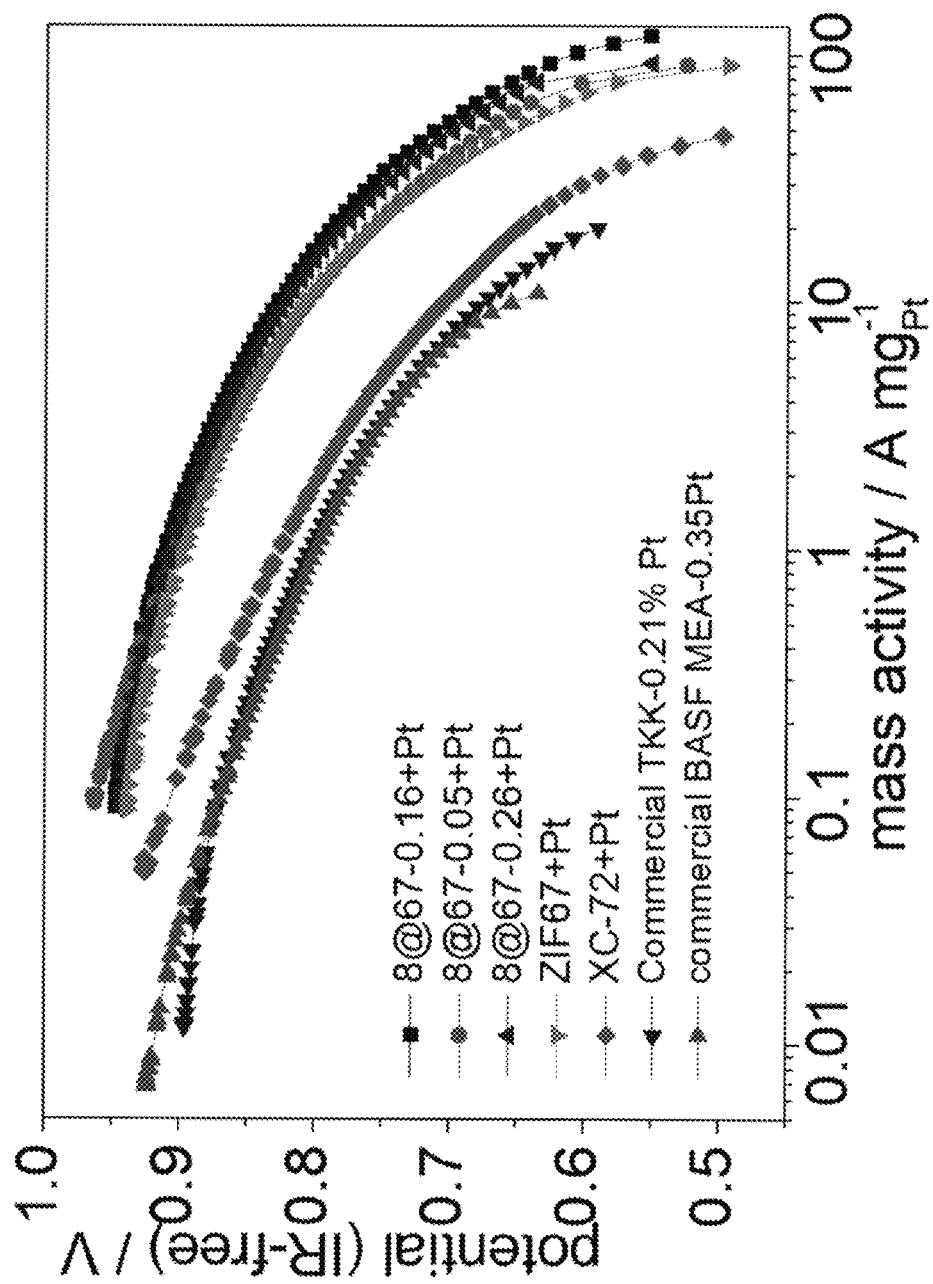
FIG. 11 The mass activity Tafel plots of the MEAs prepared according to the current invention over that prepared from commercial Pt/C catalyst and commercial MEA.

The fuel cell performances of the catalysts prepared according to the current invention were also compared to the commercial Pt/C catalysts. Specifically, a commercial Pt/C with Pt loading of 47.6 wt. % obtained from TKK company was applied to 5 $cm^2$ carbon paper gas diffusion layer with Pt loading of 0.21 mg $cm^2$ for the cathode, which was then used to prepare a MEA following the similar procedure described in Example 7, labelled as TKK-021% Pt. In addition, a commercial BASF 5 $cm^2$ MEA with platinum loading of 0.35 mg/$cm^2$ was also acquired. Both MEAs were tested in fuel cell following the same procedure described in Example 7. FIG. 11 shows the Tafel plot of fuel cell platinum mass activities of the current inventions (8@67-0.16+Pt, 8@67-0.05+Pt, 8@67-0.26+Pt, ZIF67+Pt) in comparison with that of commercial catalyst and MEA. The catalysts prepared according to the current invention show significant improvements over the commercial TKK electrocatalyst and BASF Pt membrane electrode in mass activity at any given cell potential or current density.

Example 15

Figure 12:
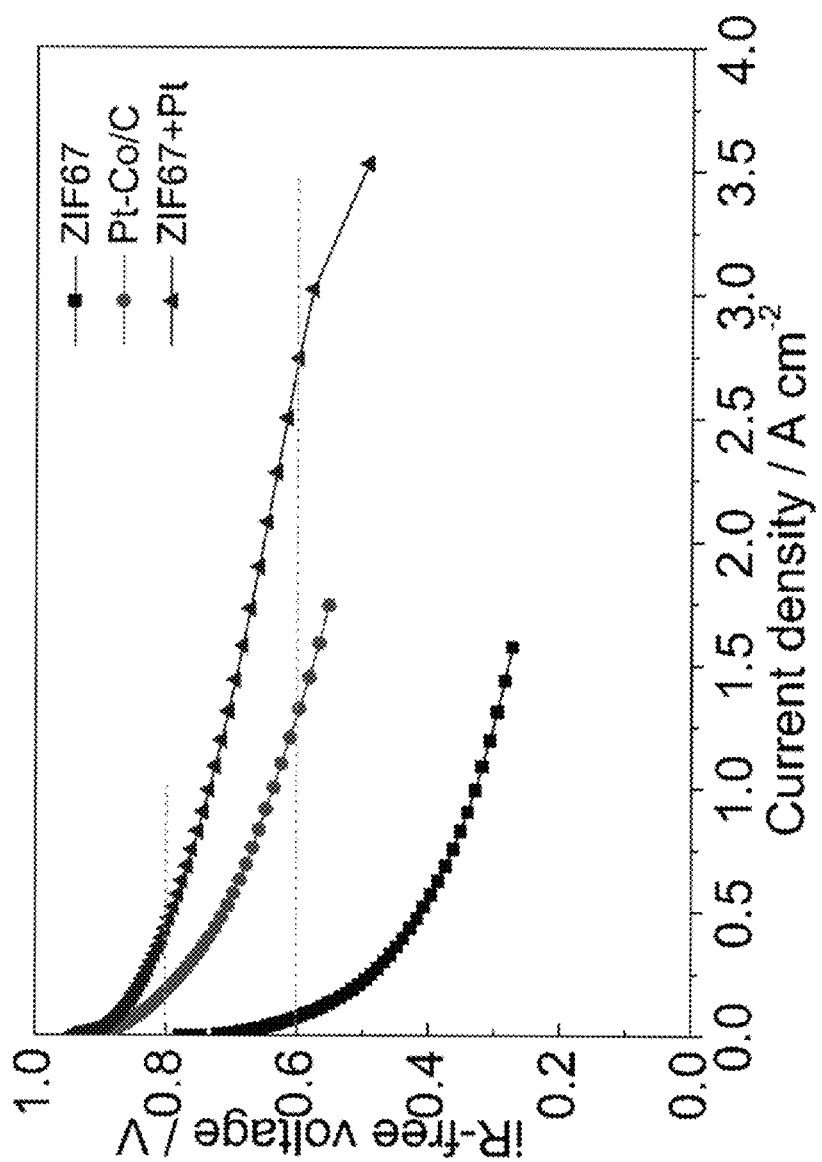
FIG. 12 The current-voltage polarizations of fuel cells with MEAs containing cathodic catalysts prepared according to Example 15 using hydrogen and oxygen as feed gases.

To demonstrate the activity of the catalyst prepared according to the current invention has a synergetic contribution from both Pt-TM portion and non-precious metal portion, a Pt—Co supported by conventional carbon, XC-72, was prepared using method described in Example 5 and named as Pt—Co/C. The catalyst has similar Pt and Co loading as that in ZIF67+Pt. The fuel cell measurement as described in Example 7 were performed over ZIF67+Pt, Pt—Co/C and ZIF67 and their current-voltage polarizations are plotted in FIG. 12. The specific current density of ZIF67+Pt prepared according to the current invention is higher than the simple summation of Pt—Co/C and ZIF67. For example, the specific current density of ZIF67+Pt at 0.8 $V_{iR\text{-}free}$ is 445 mA/$cm^2$, which is higher than the summation of 184 mA/$cm^2$ and 0 mA/$cm^2$ measured for Pt—Co/C and ZIF67, respectively, indicating a synergetic activity which is higher than the simple addition of individual component contribution.

Example 16

Figure 13:
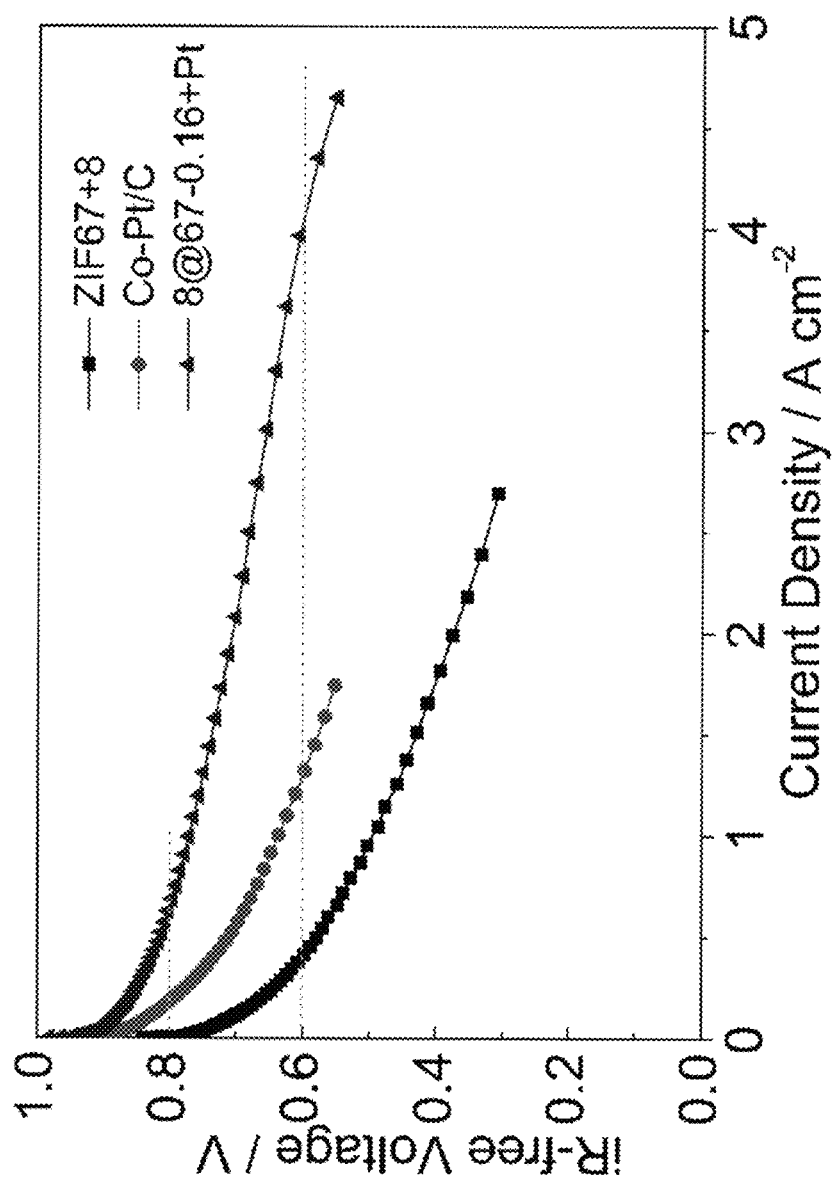
FIG. 13 The current-voltage polarizations of fuel cells with MEAs containing cathodic catalysts prepared according to Example 16 using hydrogen and oxygen as feed gases.

To further demonstrate the activity of the catalyst prepared according to the current invention has a synergetic contribution from both Pt-TM portion and non-precious metal portion, the fuel cell measurement as described in Example 7 were also performed over 8@67-016+Pt, Pt—Co/C and 8@67-0.05 and their current-voltage polarizations are plotted in FIG. 13. The specific current density of 8@67-016+Pt prepared according to the current invention is higher than the simple summation of Pt—Co/C and 8@67-0.05. For example, the specific current density of 8@67-016+Pt at 0.8 $V_{iR\text{-}free}$ is 680 mA/$cm^2$, which is higher than the summation of 184 mA/$cm^2$ and 20 mA/$cm^2$ measured for Pt—Co/C and 8@67-0.05, respectively, indicating a synergetic activity which is higher than the simple addition of individual component contribution.

Embodiments described herein are fundamentally different from the prior art by at least exhibiting the following advantages: a) the formation of bimetallic Pt-alloy using MOF based material to produce highly dispersed, uniformly distributed catalytic particle with improved activity, b) a composite with combination of Pt-TM alloy particles with a core-shell structure and atomically dispersed TM/N/C active sites, contributing additively and synergistically to the overall catalyst performance, c) Pt-TM alloy particles are partially caped by TM carbide and TM nitride, protecting Pt-TM alloy from oxidative dissolution, d) a new catalyst composite with enhanced catalytic activity as well as enhanced durability over the conventional fuel cell catalyst. Further, certain embodiments of catalysts exhibit:

Low Pt content—significantly less than the benchmark commercial Pt catalyst

High activity—Combined ORR catalytic activities synergistically from both Pt and non-PGM active sites surpassing the summation of the activities when each component measured independently.

Excellent durability—Improved over conventional Pt catalyst at identical loading and significantly better than non-PGM system alone Uniform catalytic site distribution—The catalytic sites are distributed homogenously throughout MOFs, improving conversion efficiency.

High surface area and pore size control—The MOF precursor has identical pore structure which will lead to uniform porosity and surface property throughout the catalyst during thermal activation.

Flexibility of precursor design—a wide variety of MOFs with different metals and ligands combinations are available.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of catalyst preparation:
   preparing a transition metal based metal organic framework (MOF);
   thermally treating the transition metal MOF at a temperature of 600° C. to 1050° C. for between 30 minutes and 180 minutes converting the transition metal MOF to a transition metal-nitrogen-carbon composite;
   removing a portion of the transition metal;
   adding a platinum precursor to the transition metal-nitrogen-carbon composite after removal of the portion; and
   forming platinum-transition metal bimetallic alloy microcrystallites over the transition metal-nitrogen-carbon composite.

2. The method of claim 1, wherein preparation of the transitional metal MOF comprises: a stoichiometric amount of transition metal salt and multidentate organic ligands.

3. The method of claim 2, further comprising adding a second transition metal salt in an amount equivalent to the stoichiometric amount of the multidentate organic ligands, wherein the transitional metal based MOF is a bimetallic MOF.

4. The method of claim 1, wherein preparing the transition metal based MOF further comprises:
   preparing a first transition metal based metal organic framework (MOF) from a first transition metal salt;
   preparing a second transition metal based metal organic framework (MOF) from a second transition metal salt; and
   mixing the transition metal based MOF with the second transition metal MOF;
   wherein the transition metal MOF is a bimetallic MOF.

5. The method of claim 4, wherein thermally treating the transition metal is at a temperature of 850° C. to 1050° C. for between 60 minutes and 90 minutes.

6. The method of claim 4, wherein the molar ratio of the first transition metal salt to the second transition metal salt is from 1:99 to 1:1.

7. The method of claim 4, wherein during thermal treatment, the first transition metal is converted to a zero valence metal forming the transition metal-nitrogen-carbon composition and the second transition metal is reduced and vaporized.

8. The method of claim 1, wherein thermally treating the transition metal is at a temperature of 600° C. to 950° C. for between 60 minutes and 90 minutes.

9. The method of claim 1, wherein the thermal treatment is in an environment selected from an inert environment and reactive environment under nitrogen containing gas.

10. The method of claim 1, wherein preparing the transition metal based MOF comprises a solvothermal reaction with a concentration of metal solution of 0.1 mol/L to 1.0 mol/L.

11. The method of claim 1, wherein removing a portion of the transition metal comprises applying an acid wash with an acid having a concentration in the range of 0.1 molar to 2.0 molar.

12. The method of claim 11, wherein applying the acid wash is at a temperature up to 80° C. for 0.5 hours to 72 hours.

13. The method of claim 1, wherein adding the platinum precursor comprises adding an organometallic salt or inorganic salt at a temperature of 40° C. to 80° C. for 30 minutes to 90 minutes.

14. The method of claim 1, wherein forming platinum-transition metal bimetallic alloy microcrystallites comprises reduction at temperatures of 120° C. to 250° C. under a hydrogen flow.

15. The method of claim 14, further comprising coating the composite with added platinum with an alkyl amine prior to reduction.

16. The method of claim 14, further comprising washing after reduction at the 120° C. to 250° C. for 15 minutes to 120 minutes under a hydrogen flow to remove excess alkyl amine and performing a second thermal treatment at the 600° C. to 800° C. for 15 minutes to 60 minutes.

17. A method of catalyst preparation:
preparing a transition metal based metal organic framework (MOF);
adding a platinum precursor by infiltration to the transition metal MOF;
thermally treating the transition metal at a temperature of 600° C. to 800° C. in a reducing environment for 15 minutes to 60 minutes and converting the transition metal MOF to a transition metal-nitrogen-carbon composite, forming platinum-transition metal bimetallic alloy microcrystallites over a transition metal-nitrogen-carbon composite.

18. The method of claim 17, wherein the infiltrated transition metal MOF has a dry platinum weight fraction of 2 wt % to 20 wt %.

19. The method of claim 17, wherein preparation of the transitional metal MOF comprises: a stoichiometric amount of transition metal salt and multidentate organic ligands.

20. The method of claim 17, wherein adding the platinum precursor comprises adding an organometallic salt or inorganic salt.

* * * * *